United States Patent

Dubberke

[11] Patent Number: 6,143,350
[45] Date of Patent: *Nov. 7, 2000

[54] REDUCED FAT CHOCOLATE

[75] Inventor: Karin Dubberke, Dublin, Ohio

[73] Assignee: Nestec S.A., Vevey, Switzerland

[*] Notice: This patent is subject to a terminal disclaimer.

[21] Appl. No.: 09/315,833

[22] Filed: May 21, 1999

Related U.S. Application Data

[63] Continuation of application No. 09/038,937, Mar. 12, 1998, Pat. No. 5,932,277.

[51] Int. Cl.[7] ........................................... A23G 1/00
[52] U.S. Cl. ........................................ 426/631; 426/660
[58] Field of Search ...................... 426/631, 660

[56] References Cited

U.S. PATENT DOCUMENTS

| | | | |
|---|---|---|---|
| 3,769,030 | 10/1973 | Kleinert | 426/45 |
| 4,081,568 | 3/1978 | Bracco | 426/584 |
| 4,810,516 | 3/1989 | Kong-Chan | 426/548 |
| 4,980,189 | 12/1990 | Keme et al. | 426/548 |
| 5,156,878 | 10/1992 | Tadema | 426/631 |
| 5,190,786 | 3/1993 | Anderson | 426/631 |
| 5,360,621 | 11/1994 | Mentink et al. | 426/548 |
| 5,393,538 | 2/1995 | Chmiel et al. | 426/35 |
| 5,464,649 | 11/1995 | St. John et al. | 426/660 |
| 5,468,509 | 11/1995 | Schlup et al. | 426/548 |
| 5,490,996 | 2/1996 | Despland et al. | 426/548 |
| 5,501,865 | 3/1996 | Zumbe | 426/548 |
| 5,505,982 | 4/1996 | Krawczyk et al. | 426/660 |
| 5,676,995 | 10/1997 | Cully et al. | 426/660 |
| 5,709,903 | 1/1998 | St. John et al. | 426/660 |
| 5,882,709 | 3/1999 | Zumbe | 426/631 |
| 5,932,277 | 8/1999 | Dubberke | 426/631 |
| 5,989,619 | 11/1999 | Zumbe | 426/631 |

OTHER PUBLICATIONS

Minifie 1980 Chocolate, Cocoa and Confectionery, AVI Publishing, Connecticut, p. 107, 113, 134, 114–126.

*Primary Examiner*—Carolyn Paden
*Attorney, Agent, or Firm*—Pennie & Edmonds LLP

[57] ABSTRACT

A processs for the preparation of a reduced fat milk chocolate which comprises preparing a powdered premix of substantially all the non-fat ingredients, adding up to 96% of the fat containing ingredients to the powdered premix and mixing to give a mass containing from 18 to 24% by weight fat based on the total weight of the mass, refining the mass on refining rollers to give a particle size of from 25 to 35 microns, adding the remainder of the fat containing ingredients and lecithin, conching, tempering to give a reduced fat milk chocolate containing less than 27% by weight of fat.

9 Claims, No Drawings

REDUCED FAT CHOCOLATE

This is a continuation of application Ser. No. 09/038,937, filed Mar. 12, 1998 now U.S. Pat. No. 5,932,277.

FIELD OF THE INVENTION

The present invention relates to a processs for the preparation of a reduced fat milk chocolate.

BACKGROUND OF THE INVENTION

A traditional method of producing milk chocolate is by mixing milk powder together with cocoa liquor or cocoa nibs, sugar, and cocoa butter, followed by refining, pasting, conching and tempering.

Another traditional method of producing milk chocolate is by condensing and drying either liquid milk or milk concentrate together with sugar and cocoa liquor under vacuum and at elevated temperatures to produce a chocolate crumb powder and then mixing the chocolate crumb powder with cocoa butter, followed by refining, pasting, conching and tempering.

Conventional milk chocolate contains about 30–31% fat. It may contain more or less but rarely less than 27% fat. Calorie-conscious consumers demand a chocolate with lower calories and one way of reducing the calories in chocolate is by reducing the fat content. However, there are technical difficulties in reducing the fat content of milk chocolate without causing the quality, taste and texture to be inferior to that of conventional milk chocolate. For example, reduced fat milk chocolates usually give a dry and coarse mouthfeel and the viscosity is too high for normal handling during preparation.

SUMMARY OF THE INVENTION

We have devised a process for the preparation of a reduced fat milk chocolate which has similar or even better physical characteristics than conventional milk chocolate.

Accordingly, the present invention provides a processs for the preparation of a reduced fat milk chocolate which comprises preparing a powdered premix of substantially all the non-fat ingredients, adding up to 96% of the fat containing ingredients to the powdered premix and mixing to give a mass containing from 18 to 24% by weight fat based on the total weight of the mass, refining the mass on refining rollers to give a particle size of from 25 to 35 microns, adding the remainder of the fat containing ingredients and lecithin, conching and tempering to give a reduced fat milk chocolate containing less than 27% by weight of fat.

DETAILED DESCRIPTION OF THE INVENTION

The non-fat ingredients are conveniently non-fat dry milk, non-fat cocoa powder and sucrose, preferably used in conventional proportions, e.g. from about 7.5 to 22.5% by weight of non-fat dry milk, from about 1 to 5% by weight of non-fat cocoa powder and from about 40–55% by weight of sucrose.

If desired, up to 10% by weight of cocoa liquor may be added to the premix together with additional non-fat cocoa powder, e.g. up to 4% by weight.

Conveniently, lecithin is added to the powdered premix with the fat containing ingredients, preferably in an amount of up to 60% and more preferably from 20 to 40% by weight of the total lecithin in the final reduced fat chocolate.

The fat containing ingredients are conveniently cocoa butter, milk fat, cocoa liquor preferably added in amounts to give a mass containing from 60 to 85% and more preferably from 75–80% by weight of the total fat in the final reduced fat chocolate.

The fat containing ingredients may be added in conventional proportions, e.g. from about 10 to 25% by weight of cocoa butter, 3 to 7% by weight of milk fat and from 5 to 15% by weight of cocoa liquor. Preferably, the fat containing ingredients are blended before adding to the premix.

Surprisingly, the mass containing from only 18% to 24% by weight fat (compared with between 24 and 28% used conventionally) is relatively wet and can be refined without technical problems conventionally, e.g. on 2, 3 or 5-roll refiners. Preferably, the mass contains from 18.75 to 21% by weight fat based on the total weight of the mass.

Although not wishing to be bound by theory, the fats in conventional milk chocolate ingredients are mostly bound (immobile) in either the crumb or in the whole milk powder and cocoa liquor. Therefore, only about 40% of the total fat can be added as free mobile fat. By using non-fat powders (instead of crumb, whole milk powder or cocoa liquor), the remaining fat (from 90% to almost 100% of the total) can be added in its free mobile form to lubricate the dry material and this has a significant positive impact on the viscosity and texture (mouthfeel) of the product. Since the fat is available free (mobile) fat, the refiner mass is relatively wet at low fat contents.

The remainder of the fat containing ingredients together with the lecithin or the remainder of the lecithin is conveniently added during the conching stage, preferably towards the end of the conching stage. The conching may be carried out conventionally, e.g. from 60° to 80° C. for 4 to 8 hours in a B-Conche.

The reduced fat milk chocolate of the present invention has the same or better physical characteristics such as texture, mouthfeel (lubrication), snap, viscosity, handling (tempering, mould, enrobing), and gloss than a conventional milk chocolate, e.g. containing 30–31% by weight fat.

The reduced fat milk chocolate can be processed and made into final products using conventional equipment.

The present invention also provides a reduced fat milk chocolate containing at least 90% by weight of fat in its free mobile form obtainable by the process of the present invention.

EXAMPLE

The following Example further illustrates the present invention. parts and percentages are given by weight.

Example 1

50.16 parts of sucrose, 17.21 parts of skimmed milk powder and 3.02 parts of non-fat cocoa powder are blended in a Hobart mixer to form a premix. 10.01 parts of cocoa liquor, 15.17 parts of deodorized cocoa butter and 4.11 parts of anhydrous milk fat are mixed in a Hobart mixer to give a fat blend. 69% of the fat blend together with 0.09 parts of lecithin are added to the premix and the whole blended in a Hobart mixer to give a mass containing 20.8% fat.

The mass is refined on a 3-roll refiner to give a refined low-fat material having a particle size of 27 microns. The refined low-fat material is loaded into the conche, together with the remaining fat and 0.055 parts of lecithin. The material is conched at 158° F. (70° C.) for 5.5 hours and then 0.155 parts of lecithin and 0.02 parts of vanillin is added and the whole material conched for a further 0.5 hours.

The milk chocolate produced is easy to remove from the conche and has a plastic viscosity of 45.45 dynes×sec./cm2, a yield value of 97.3 dynes/cm2 and MCM of 40.33 degrees MacMichael. The chocolate has a total fat content of 25.2% by weight.

What is claimed is:

1. A process for the preparation of a reduced fat milk chocolate which comprises preparing a powdered premix of substantially all non-fat ingredients which at least include dry milk and cocoa, adding up to 96% of at least one fat containing ingredient to the powdered premix and mixing to give a mass containing from 18 to 24% by weight fat based on the total weight of the mass, refining the mass on refining rollers to a particle size of from 25 to 35 microns, adding additional fat containing ingredients and lecithin to the refined mass, and conching and tempering the resulting mixture to obtain a reduced fat milk chocolate containing less than 27% by weight of fat.

2. A process according to claim 1 wherein the non-fat ingredients are non-fat dry milk, non-fat cocoa powder and sucrose.

3. A process according to claim 1 wherein up to 10% of cocoa liquor is added to the premix together with additional non-fat cocoa powder.

4. A process according to claim 1 wherein lecithin is added to the powdered premix with the fat containing ingredients in an amount of up to 60% by weight of the total lecithin in the final reduced fat chocolate.

5. A process according to claim 1 wherein the fat-containing ingredients are cocoa butter, milk fat, cocoa liquor.

6. A process according to claim 1 wherein the fat containing ingredients are added in amounts to give a mass containing from 60 to 85% by weight of the total fat in the final reduced fat chocolate.

7. A process according to claim 1 wherein the remainder of the fat containing ingredients together with the lecithin or the remainder of the lecithin is added during the conching stage.

8. A process according to claim 1 wherein the remainder of the fat containing ingredients together with the lecithin or the remainder of the lecithin is added towards the end of the conching stage.

9. A reduced fat milk chocolate containing at least 90% by weight of fat in its free mobile form obtainable by the process of claim 1.

* * * * *